United States Patent
Monahan

(10) Patent No.: US 8,680,420 B2
(45) Date of Patent: Mar. 25, 2014

(54) MECHANICAL MEANS TO REDIRECT INTERNAL ARC LOCATION

(75) Inventor: Terry Monahan, Lebanon, TN (US)

(73) Assignee: Schneider Electric USA, Inc., Palatine, IL (US)

( * ) Notice: Subject to any disclaimer, the term of this patent is extended or adjusted under 35 U.S.C. 154(b) by 265 days.

(21) Appl. No.: 13/328,432

(22) Filed: Dec. 16, 2011

(65) Prior Publication Data

US 2013/0153541 A1 Jun. 20, 2013

(51) Int. Cl.
*H01H 33/53* (2006.01)
(52) U.S. Cl.
USPC .......................................... 218/157; 218/154
(58) Field of Classification Search
USPC ................................................. 218/154–157
See application file for complete search history.

(56) References Cited

U.S. PATENT DOCUMENTS

| | | | | |
|---|---|---|---|---|
| 5,710,402 | A * | 1/1998 | Karnbach et al. | 218/157 |
| 5,892,195 | A * | 4/1999 | Aufermann et al. | 218/157 |
| 6,410,844 | B1 * | 6/2002 | Bruner et al. | 174/17 VA |
| 6,417,443 | B1 | 7/2002 | Smith | |
| 7,952,042 | B2 * | 5/2011 | Coomer et al. | 200/302.1 |
| 8,101,881 | B2 * | 1/2012 | Miller et al. | 218/157 |
| 2005/0258141 | A1 * | 11/2005 | Meeks et al. | 218/154 |
| 2009/0212022 | A1 * | 8/2009 | Josten et al. | 218/157 |
| 2010/0258532 | A1 * | 10/2010 | Miller et al. | 218/157 |
| 2012/0097413 | A1 * | 4/2012 | Bugaris et al. | 174/50 |

FOREIGN PATENT DOCUMENTS

| | | |
|---|---|---|
| DE | 75 05 183 U | 6/1975 |
| DE | 31 31 417 A1 | 2/1983 |
| DE | 33 11 860 A1 | 10/1983 |
| EP | 2 169 795 A1 | 3/2010 |
| WO | WO2008/136112 A1 | 11/2008 |

OTHER PUBLICATIONS

International Search Report corresponding to International Application No. PCT/US2012/067832, dated Feb. 19, 2013, 4 pages.
Written Opinion corresponding to International Application No. PCT/US2012/067832, dated Feb. 19, 2013, 7 pages.

* cited by examiner

*Primary Examiner* — Truc Nguyen
(74) *Attorney, Agent, or Firm* — Locke Lord LLP

(57) ABSTRACT

An electrical enclosure includes a mechanism for moving and/or extinguishing an arc fault occurring in a first compartment of the electrical enclosure. The mechanism is positioned adjacent to a busbar in a second compartment of the electrical enclosure. In the case of a first arc fault occurring in the first compartment, an explosion occurs which results in a pressure wave. The pressure wave causes the mechanism to move into the second compartment and make electrical contact with the busbar, which causes a short and/or a second arc fault in the second compartment, thereby extinguishing the first arc fault in the first compartment.

20 Claims, 4 Drawing Sheets

MECHANICAL MEANS TO REDIRECT INTERNAL ARC LOCATION

FIELD OF THE INVENTION

The present invention relates generally to electrical equipment and, more particularly, to electrical enclosures having mechanical means to redirect internal arc locations.

BACKGROUND OF THE INVENTION

Electrical enclosures sometimes experience failures where arcing can occur within the enclosure. In some instances, the arcing is so powerful that it can burn and/or melt through the housing of the enclosure. Such a situation is undesirable and potentially life-threatening to anyone standing around the enclosure. Electrical standards call for an electrical enclosure to be able to withstand an arc fault of X kiloamps for Y seconds and remain intact (i.e., not breached) and not deform more than Z inches (variables X, Y, and Z can vary depending on the type of equipment, location, etc.). Prior solutions to this problem typically include making the housing more durable by including extra housing panels and/or thicker panels. However, such a solution can be expensive. Thus, a need exists for an improved apparatus. The present disclosure is directed to satisfying one or more of these needs and solving other problems.

SUMMARY OF THE INVENTION

The present disclosure is directed to an electrical enclosure including a mechanism for moving and/or extinguishing an arc fault occurring in a first compartment of the electrical enclosure. The mechanism can be a blast door positioned adjacent to a busbar in a second compartment of the electrical enclosure that is positioned above the first compartment. The first compartment includes one or more conductors that are electrically positioned downstream from the busbars (i.e., the busbars feed the conductors in the first compartment). In essence, aspects of the present disclosure exploit a pressure wave produced by an arc fault originating within the enclosure to blast open a blast door that effectively shorts out the busbars, thereby creating a less destructive path for the energy released by the arc fault to travel, thereby attenuating and/or extinguishing the primary arc fault. In other words, by shorting out the busbars, the blast door creates an intentional fault to provide a path for the energy produced by the main arc fault in a more safe and controlled manner that helps to maintain the structural integrity of the enclosure and thereby the safety of nearby equipment and persons.

In the case of a first arc fault occurring in the first compartment, an explosion occurs in the first compartment which results in a pressure wave moving through the enclosure towards one or more vents in the enclosure. The explosion caused by the first arc fault causes the blast door to blow inward into the second compartment. Due to the position of the blast door, it is forced into electrical contact with the busbar, which causes a short and/or a second arc fault in the second compartment. As the busbar is electrically coupled with the conductors in the first compartment where the first arc fault initiated, the shorting and/or second arc fault redirects the current away from the conductor involved with the first arc fault, which attenuates and/or extinguishes the first arc fault. Put another way, the second arc fault uses the energy supplying the first arc fault and redirects it. The redirected energy can be grounded through the blast door and/or used up in creating a second arc fault in the second compartment.

In most situations, a circuit breaker is electrically coupled to the enclosure. The circuit breaker is rated to kill all power flowing to the enclosure in a set amount of time; however, prior to the circuit breaker switching off and killing the power, power is still distributed to the enclosure. It is this amount of power/energy that must be dissipated within the enclosure via the arc faults. The attenuating and/or extinguishing of the first arc and the creating of the second arc (i.e., the moving of the arc) distributes this total amount of power/energy being dispersed into the enclosure during the failure into two different compartments, rather than into a single compartment. Such a distribution of the energy during the failure reduces the likelihood that one of the arc faults will breach the enclosure.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

DETAILED DESCRIPTION OF THE ILLUSTRATED EMBODIMENTS

Although the present disclosure is described in connection with certain aspects and/or embodiments, it will be understood that the present disclosure is not limited to those particular aspects and/or embodiments. On the contrary, the present disclosure is intended to cover all alternatives, modifications, and equivalent arrangements as may be included within the spirit and scope of the present disclosure as defined by the appended claims.

Figure 1:
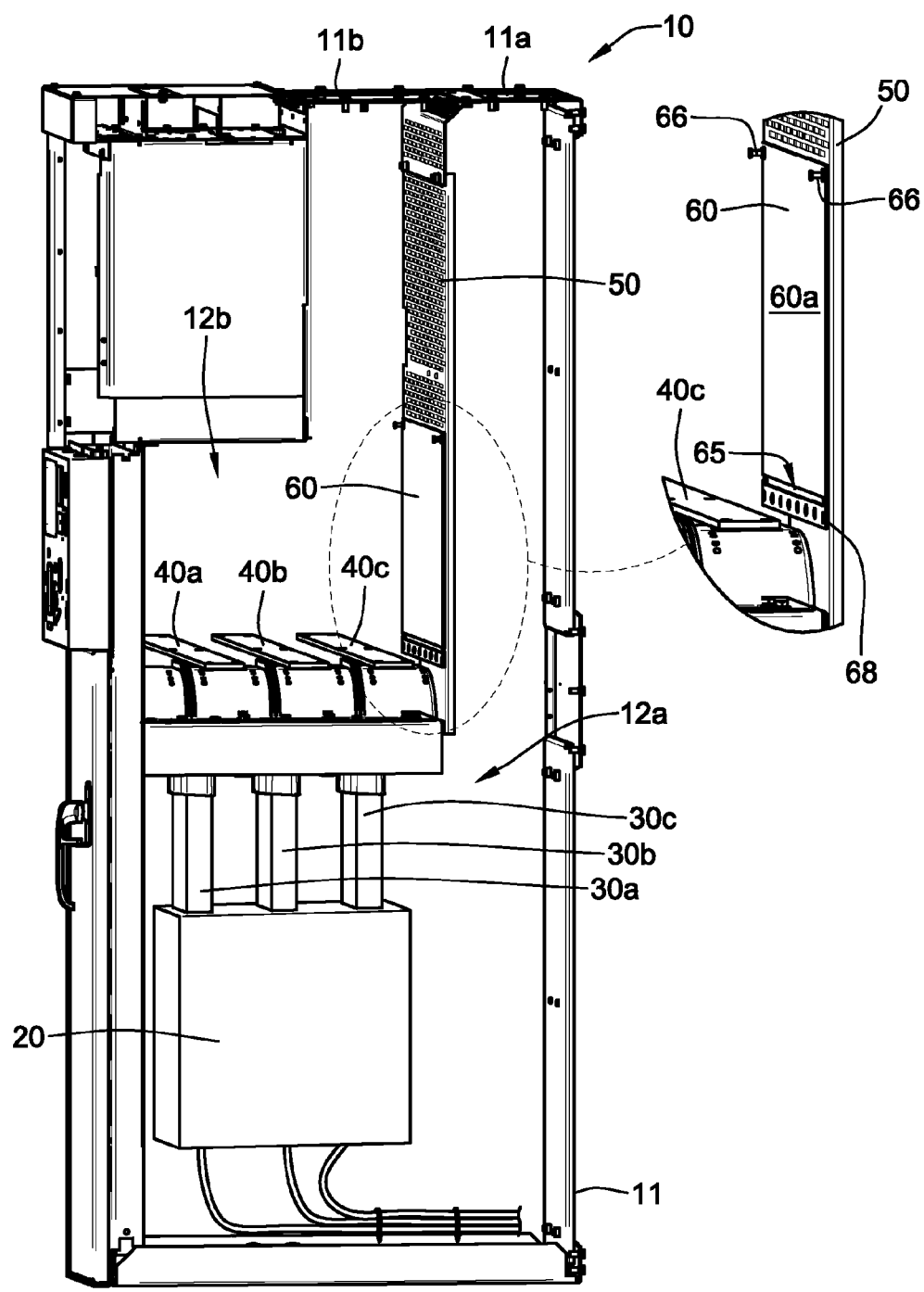
FIG. 1 is a perspective view of an electrical enclosure having first and second internal compartments and a blast door according to some aspects of the present disclosure.

Referring to FIG. 1, an electrical enclosure or a panelboard 10 includes an outer housing 11, a first internal compartment 12a, and a second internal compartment 12b. While not shown, the enclosure 10 is configured to be electrically coupled between one or more electrical supplies and/or one or more electrical loads. Between the one or more electrical supplies and the enclosure 10 can be a circuit breaker (not shown) configured to kill all electrical power being supplied to the enclosure 10 in a set amount of time (e.g., 100 millisecond, 100 microseconds, 1 second, etc.) in response to a fault (e.g., an arc fault, etc.) occurring within the enclosure 10 and/or downstream of the enclosure 10. The first and the second internal compartments 12a, 12b are separated by at least a wall 50 and a mechanism 60 inside the enclosure 10.

These structures will be described in more detail below. Each compartment 12a, 12b is also defined by at least two outer walls of the enclosure 10.

The first internal compartment 12a of the enclosure 10 conventionally includes one or more pieces of medium or low voltage equipment 20 (e.g., contactors, load connections, power transformers, current transformers, etc.). The equipment 20 is supplied with electrical current via three conductors 30a, 30b, and 30c. The first conductor 30a supplies a first or "A" phase of electricity to the equipment 20, the second conductor 30b supplies a second or "B" phase of electricity to the equipment 20, and the third conductor 30c supplies a third or "C" phase of electricity to the equipment 20. The conductors 30a-c are typically electrically insulated from one another by a thin insulating material, such as a polyester film, which is conventionally wrapped around each of the conductors 30a-c; however, one or more portions of the conductors 30a-c can be exposed, such as, for example, an end of the conductors 30a-c within the equipment 20 can be exposed for electrically coupling the conductors 30a-c to the equipment 20 via, for example, one or more lugs (not shown).

The second internal compartment 12b of the enclosure 10 includes three busbar conductors or busbars 40a-c. The first busbar 40a supplies the first or "A" phase of electrical current to the first conductor 30a, the second busbar 40b supplies the second or "B" phase of electrical current to the second conductor 30b, and the third busbar 40c supplies the third or "C" phase of electrical current to the third conductor 30c. That is, the first busbar 40a is electrically coupled to the first conductor 30a, the second busbar 40b is electrically coupled to the second conductor 30b, and the third busbar 40c is electrically coupled to the third conductor 30c. The busbars 40a-c are typically electrically insulated with electrical insulation as shown, for example, in FIG. 5, where the first busbar 40a includes electrical insulation 42a that is conventionally wrapped around the busbar 40a to insulate its otherwise exposed conductive surfaces. The electrical insulation electrically insulates the busbars 40a-c from each other, the outer housing 11, and any other surrounding components. There can be one or more portions of the busbars 40a-c that are at least partially exposed, such as, for example, where the busbars 40a-c are coupled with the conductors 30a-c. However, these connections can also be electrically insulated by, for example, a boot that covers the joint. While the joint is electrically insulated, the boot-type insulation is not always airtight.

The second internal compartment 12b is formed at least partially by an internal wall 50. The internal wall 50 has an opening 52 (see FIG. 3) positioned adjacent to the third busbar 40c. As shown in FIG. 1, the opening 52 is obstructed by a mechanism or blast door 60 operatively coupled to the wall 50 by a living hinge as described in further detail below. The mechanism 60 has a first portion or surface 60a (FIGS. 1 and 2) and a second portion or surface 60b (FIG. 3). The first portion 60a of the mechanism 60 is positioned within the second internal compartment 12b and the second portion 60b of the mechanism 60 is in fluid communication with the first internal compartment 12a. Specifically, as shown in FIG. 1, the first internal compartment 12a extends along a side of the wall 50 towards a vent 11a in the outer housing 11 such that the second portion 60b is in fluid communication with air and/or debris passing through the first internal compartment towards the vent 11a.

The mechanism 60 can be a metal plate having a length dimension sufficient to extend across all three busbars 40a-c when blasted open by an arc fault as described below. Regardless of how many busbars are present in various implementations, the mechanism 60 is dimensioned such that it will short out all busbars along its length when blasted away from the opening 52 during an arc fault event that originates inside the first compartment 12a. Alternatively, in some aspects of the present disclosure, the mechanism can have a length dimension that is sufficient to only extend across some of the busbars 40a-c (e.g., only busbar 40c) when blasted open (not shown). In such alternatives, the shorting of the "C" phase busbar 40c can create arcing between the busbar 40c and ground through the mechanism 60 which generates plasma and gases within the second internal compartment 12b. Because the "A" and "B" phase busbars 40a,b can have portions exposed, such as, for example, due to the boot-type insulation described above, the gases and plasma can cause the "A" and/or "B" phases to also arc to ground and/or to other phases. By arc fault or arcing it is meant that a discharge of electricity occurs through a gas (e.g., air).

As best shown in the enlarged view of the mechanism 60 in FIG. 1, the mechanism is coupled to the wall 50 via a pair of temporary fasteners 66 and multiple permanent fasteners 68. The temporary fasteners 66 can be, for example, rivets (plastic or metal), screws, nails, glue, tack welds, etc. Similarly, the permanent fasteners 68 can be, for example, rivets (plastic or metal), screws, nails, glue, welds (tack or lines), etc. The mechanism 60 includes one or more slots or lines of weakness 65. The one or more slots 65 are positioned along a bottom of the mechanism 60 and act as a living hinge. In response to an arc-fault explosion in the first internal compartment 12a, the mechanism 60 blows into the second internal compartment 12b. Specifically, the explosion causes the temporary fasteners 66 to release a top of the mechanism 60 from attachment with the wall 50 and causes the mechanism 60 to bend and/or deform along the slots 65 in a hinge-type motion, as further described below in reference to FIGS. 2 and 3.

Figure 2:
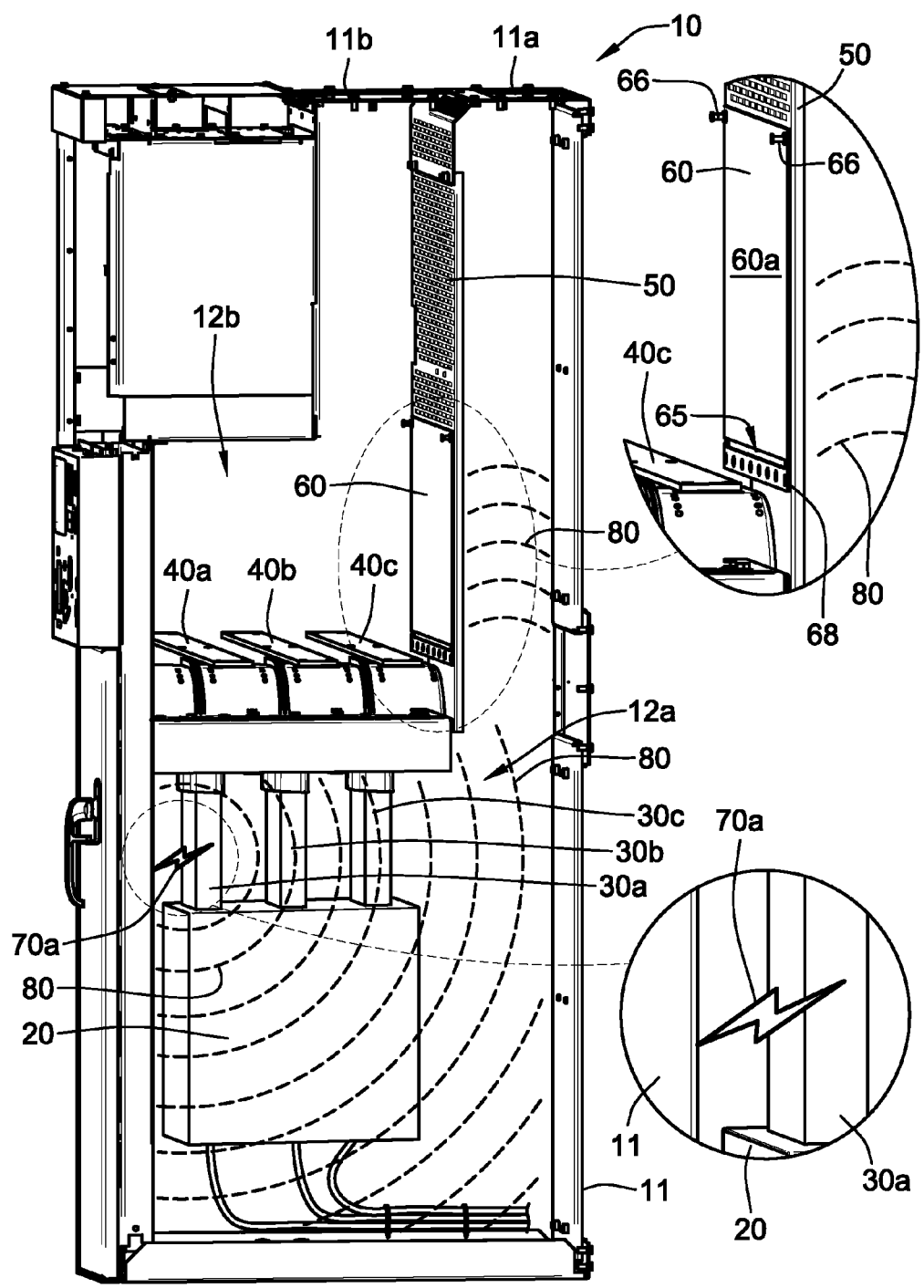
FIG. 2 is a perspective view of the electrical enclosure of FIG. 1 illustrating a pressure wave caused by a first arc fault occurring in the first internal compartment of the electrical enclosure with the blast door in a latched position.
Figure 3:
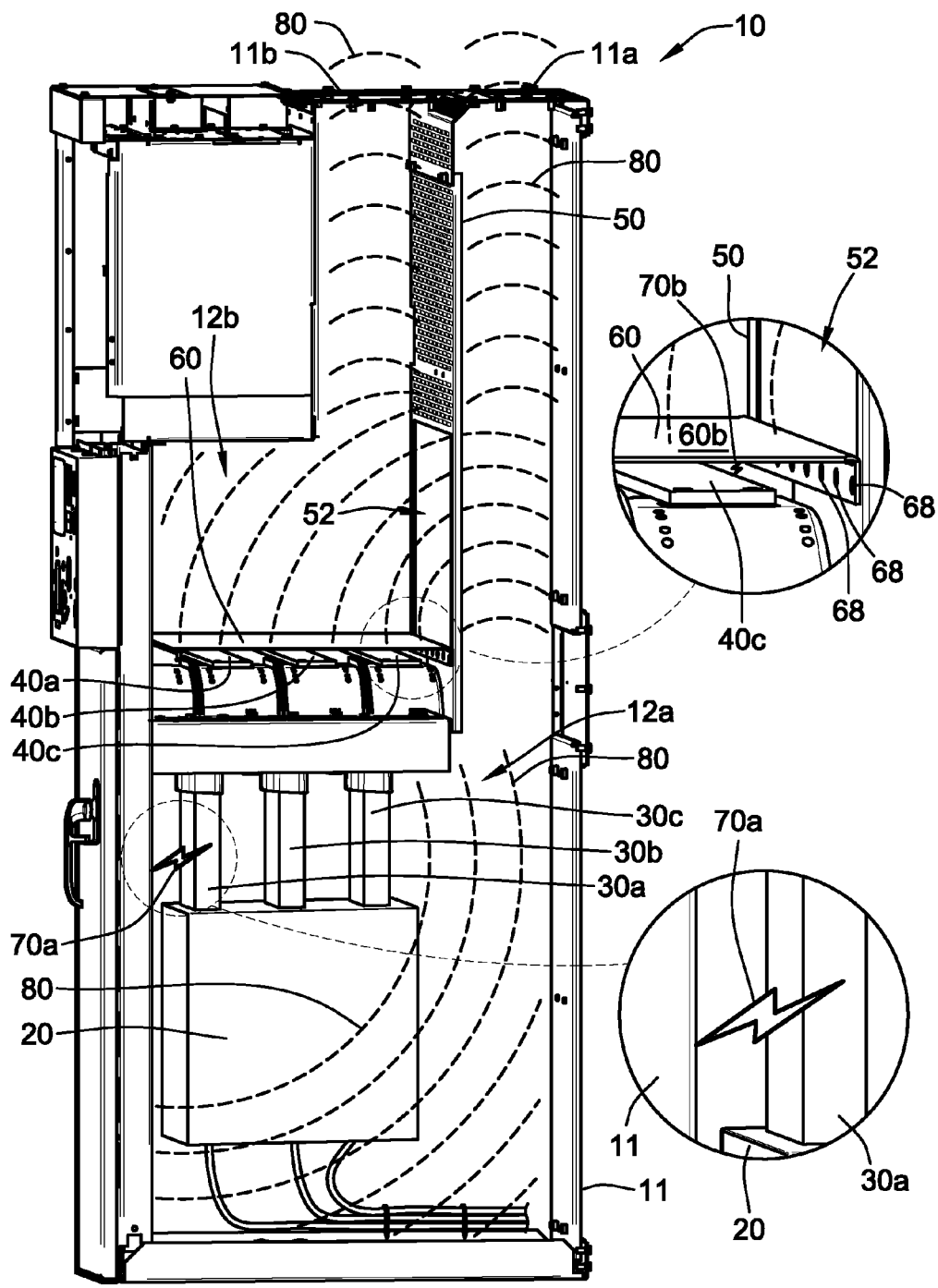
FIG. 3 is a perspective view of the electrical enclosure of FIG. 1 illustrating the pressure wave caused by the first arc fault occurring in the first internal compartment of the electrical enclosure with the blast door in a blown position.

Referring to FIG. 2, a first arc fault 70a is shown occurring between the outer housing 11 and the first conductor 30a within the first compartment 12a. The first arc fault 70a causes the first or "A" phase of electricity being distributed from the first busbar 40a to the first conductor 30a to be grounded through the metal outer housing 11 instead of being supplied to the equipment 20. The first arc fault 70a also produces hot plasma/debris accompanied by an explosion within the enclosure 10 such that a pressure wave or shockwave 80 is created. In some aspects, the first arc fault 70a can cause additional arcing and/or shorting of the second and/or third phases of electricity within the first internal compartment 12a of the enclosure 10 (not shown).

The pressure wave 80 moves from the origination location of the first arc fault 70a outward within the enclosure 10. The pressure wave 80 carries any debris and hot gases formed due to the first arc fault 70a through the vent 11a and/or one or more additional vents 11b in the outer housing 11 of the enclosure 10. As the pressure wave 80 moves towards the vents 11a,b, as shown in FIG. 2, the pressure wave 80 moves past the mechanism 60. The pressure wave 80 causes the mechanism 60 to "blow" or move from its latched or attached position (shown in FIGS. 1 and 2) to its blown position (shown in FIG. 3). Specifically, the pressure wave 80 causes the temporary fasteners 66 to give way such that a top portion of the mechanism 60 separates from the wall 50, allowing the mechanism 60 to pivot about the living hinge formed by the slots 65. Additionally, as the pressure wave 80 expands/moves outward towards the vents 11a,b, the pressure wave 80 at least partially enters the second internal compartment 12b through the opening 52 in the wall 50.

Because the mechanism 60 includes the living hinge (i.e., the one or more slots 65) affixed to the wall 50 by the permanent fasteners 68, the pressure wave 80 causes the mechanism 60 to deform and/or bend in a hinge-like manner. The mechanism 60 acts like a door that slams open with enough force to cause the mechanism 60 to physically and electrically couple with the busbars 40a-c, thereby effectively shorting them out. As shown in FIG. 3, the pressure wave 80 caused the mechanism 60 to abut or contact all three of the busbars 40a-c; however, the mechanism 60 need not physically abut or contact the busbars 40a-c to become electrically coupled with the busbars 40a-c.

The electrically coupling of the mechanism 60 with the busbars 40a-c redirects the first, second, and third phases of electricity being distributed by the busbars 40a-c from being distributed to the first, second, and third conductors 30a-c, respectively, to instead being grounded through the wall 50 via the mechanism 60. That is, the mechanism 60 is designed and positioned such that the pressure wave 80 intentionally causes the mechanism 60 to create a second fault in the second internal compartment 12b by electrically coupling the mechanism 60 with the busbars 40a-c. The electrical coupling of the mechanism 60 with the busbars 40a-c can create one or more shorts to ground, one or more shorts between phases, one or more arcs to ground, and/or one or more arcs between phases within the second internal compartment 12b. For example, as shown in the enlarged portion of FIG. 3, a second arc fault 70b is created between the mechanism 60 and the third busbar 40c.

By electrically coupling the mechanism 60 with the busbars 40a-c, it is meant that electrical current can travel from the busbars 40a,b,c to the mechanism 60 either by the mechanism physically touching one or more of the busbars 40a-c and/or by the mechanism 60 being blown/bent close enough to the busbars 40a-c such that the electrical current jumps (i.e., arcs) through the air to the busbars 40a-c. In some aspects, the blowing open of the mechanism 60 can initially cause the mechanism 60 to physically abut or touch one or more of the busbars 40a-c, yet, due to spring in the mechanism 60, the mechanism 60 can spring back such that the mechanism 60 no longer physically abuts or touches the busbars 40a-c, yet remains electrically coupled thereto (e.g., via arcing between the busbars 40a-c and the mechanism 60). During normal operation when no arc fault is present in the first compartment 12a, electrical current flows from each of the busbars 40a,b,c to the respective conductors 30a,b,c and to the equipment 20. The electrical current during normal operation does not flow from any of the busbars 40a,b,c to the mechanism 60, because otherwise a ground fault would occur.

The creation of the second fault(s) within the second internal compartment 12b of the enclosure 10 causes the first arc fault 70a to be extinguished and/or at least attenuated (i.e., reduced in magnitude). Specifically, the first arc fault 70a is extinguished because the power/energy supplying the first arc fault 70a is redirected upstream from the first conductor 30a through the mechanism 60 instead of through the first conductor 30a. While a second fault is intentionally created within the second internal compartment 12b, the total energy being dissipated within the enclosure 10 is split between the first and the second internal compartments 12a,b. Thus, any damage to the housing 11 of the enclosure 10 is split into at least two compartments, which can reduce the likelihood that either of the faults 70a,b breaches the housing 11.

Figure 5:
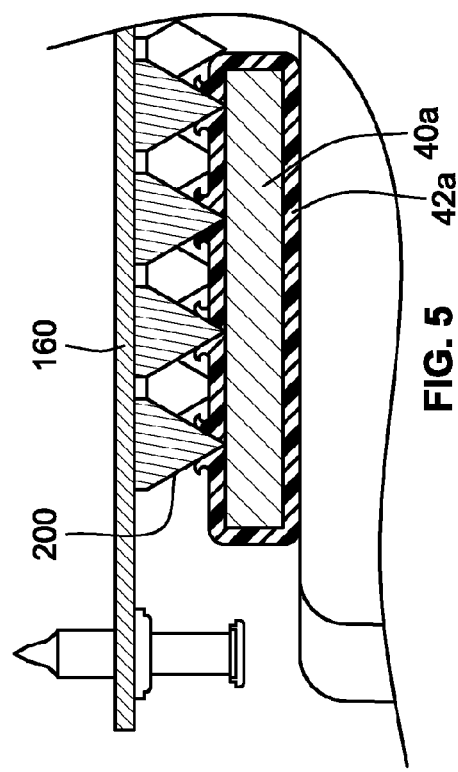
FIG. 5 is a front view of the blast door of FIG. 4 in a blown position engaging a busbar according to some aspects of the present disclosure.
Figure 4:
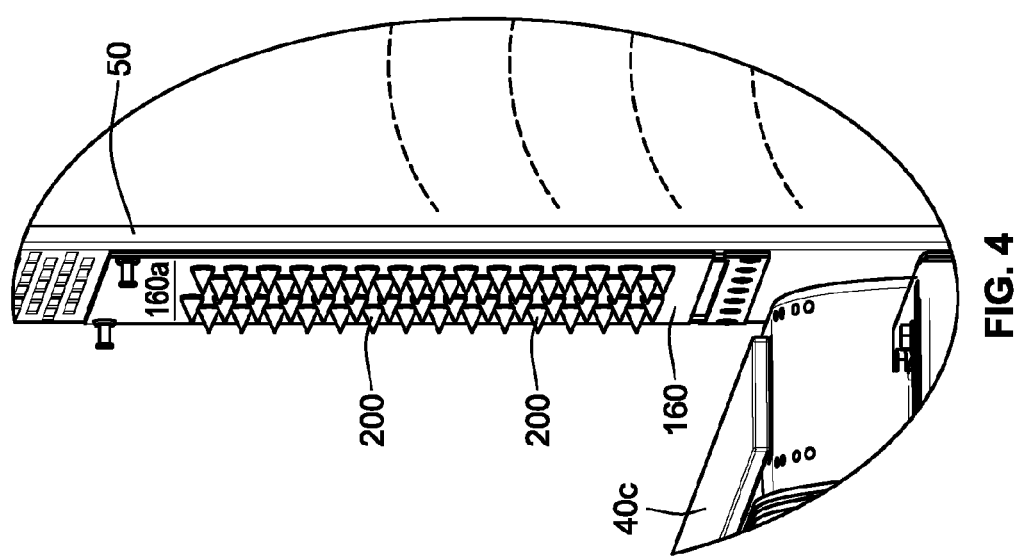
FIG. 4 is a perspective view of a blast door including a plurality of piercing members in a latched position according to some aspects of the present disclosure.

The above disclosure 10 assumes that at least a portion (if not all) of the busbars 40a-c are exposed such that the mechanism 60 can become electrically coupled with the busbars 40a-c in response to the mechanism 60 being blown open due to the first arc fault 70a. However, in some aspects of the present disclosure, the busbars 40a-c can be insulated with electrical insulation that prevents the mechanism 60 from directly electrically coupling with busbars 40a-c. Referring to FIG. 4, an alternative mechanism 160 is shown including piercing members 200. The piercing members 200 are attached to a first portion 160a of the mechanism 160 such that in response to the mechanism 160 being blown inward toward the second compartment 12b in the same, or similar, manner described above in reference to the mechanism 60, the piercing members 200 pierce the electrical insulation of the busbars 40a-c. For example, as shown in FIG. 5, the piercing members 200 are shown as having pierced through the electrical insulation 42a surrounding the first busbar 40a (the piercing members 200 also pierce through similar insulation surrounding the second and third busbars 40b,c, which is not shown). The piercing members 200, which are composed of an electrically conductive material, thus provide a path for the electrical current to travel to the mechanism 160 and then to ground via the wall 50 (FIG. 4).

While the mechanism 60, 160 has been described above and shown in the FIGS. as being a rectangular, metal blast door, the mechanism can have a variety of other shapes and/or forms. For example, the mechanism can be a pivoting bar, where the mechanism has a first portion and a second portion at least partially within the second internal compartment 12b. The first portion of the mechanism can be positioned to at least partially obstruct a fluid path between the first internal compartment 12a and the vent 11a of the outer housing 11 such that the pressure wave 80 causes the first portion of the mechanism to move. As the first portion of the mechanism is moved, the mechanism can pivot and/or otherwise move such that the second portion of the mechanism in the second internal compartment 12b engages the busbars 40a-c in the same, or similar, fashion as described above. Additionally, the first portion of the mechanism can be a plate (e.g., metal or plastic) that obstructs the fluid path. In such aspects, the plate can act as a sail to catch the pressure wave 80 and/or debris to aid in causing the mechanism to move.

While particular aspects, embodiments, and applications of the present disclosure have been illustrated and described, it is to be understood that the present disclosure is not limited to the precise construction and compositions disclosed herein and that various modifications, changes, and variations may be apparent from the foregoing descriptions without departing from the spirit and scope of the present disclosure as defined in the appended claims.

What is claimed is:

1. An electrical enclosure, comprising:
   an outer housing having at least two internal compartments, a first conductor positioned within a first of the internal compartments and a second conductor positioned within a second of the internal compartments, the first conductor being electrically coupled with the second conductor; and
   a mechanism having a first portion positioned within the second internal compartment and a second portion in fluid communication with the first internal compartment such that the mechanism is configured to move and electrically couple with the second conductor in response to a first arc fault occurring in the first internal compartment to cause a second arc fault to occur within the second internal compartment.

2. The electrical enclosure of claim 1, wherein the mechanism is configured to move in response to a pressure wave acting thereon, the pressure wave being created by the first arc fault occurring in the first internal compartment.

3. The electrical enclosure of claim 2, wherein the mechanism is a blast door operatively coupled to a wall of the second internal compartment such that the pressure wave causes the blast door to blast into the second internal compartment and such that the blast door remains at least partially attached to the wall of the second internal compartment.

4. The electrical enclosure of claim 2, wherein the outer housing includes a vent in fluid communication with the first internal compartment.

5. The electrical enclosure of claim 4, wherein the second portion of the mechanism is positioned to at least partially obstruct a fluid path between the first internal compartment and the vent of the outer housing such that the pressure wave causes the second portion of the mechanism to move.

6. The electrical enclosure of claim 5, wherein the second portion of the mechanism is a metal plate.

7. The electrical enclosure of claim 1, wherein the creation of the second arc fault in the second internal compartment attenuates the first arc fault occurring in the first internal compartment.

8. The electrical enclosure of claim 1, wherein the second conductor includes electrical insulation and the first portion of the mechanism includes a piercing member configured to pierce the electrical insulation in response to the first arc fault occurring in the first internal compartment.

9. The electrical enclosure of claim 1, wherein the second internal compartment is at least partially positioned above the first internal compartment.

10. The electrical enclosure of claim 1, wherein the second conductor includes one or more busbars for distributing one or more respective phases of electricity.

11. The electrical enclosure of claim 10, wherein the first conductor includes one or more electrical conductors electrically coupled with respective ones of the one or more busbars to distribute the one or more phases of electricity to one or more loads.

12. An electrical enclosure, comprising:
an outer housing having at least two internal compartments, a first conductor positioned within a first of the internal compartments and a second conductor positioned within a second of the internal compartments, the first conductor being electrically coupled with the second conductor;
an internal wall positioned within the outer housing and forming at least a portion of the second internal compartment, the internal wall having an opening positioned adjacent to the second conductor; and
a blast door operatively coupled to the internal wall such that:
(1) the blast door obstructs a majority of the opening; and
(2) the blast door is configured to move with respect to the internal wall and electrically couple the second conductor with the blast door in response to a first arc fault occurring in the first internal compartment and to cause a second arc fault to occur within the second internal compartment.

13. The electrical enclosure of claim 12, wherein the blast door is configured to move in response to a pressure wave acting thereon, the pressure wave being created by the first arc fault occurring in the first internal compartment.

14. The electrical enclosure of claim 12, wherein the second arc fault extinguishes the first arc fault occurring in the first internal compartment.

15. The electrical enclosure of claim 12, wherein the second arc fault at least attenuates the first arc fault occurring in the first internal compartment.

16. The electrical enclosure of claim 12, wherein the second conductor includes electrical insulation and the blast door includes a piercing member configured to pierce the electrical insulation in response to the first arc fault occurring in the first internal compartment.

17. An electrical enclosure, comprising:
an outer housing having at least two internal compartments, first and second conductors positioned within a first of the internal compartments and first and second busbars positioned within a second of the internal compartments, the first and the second conductors being electrically coupled with the first and the second busbars, respectively, the first and the second busbars being at least partially surrounded by electrical insulation;
an internal wall positioned within the outer housing and forming at least a portion of the second internal compartment, the internal wall having an opening positioned adjacent to the first and the second busbars; and
a blast door operatively coupled to the internal wall and including a plurality of piercing members, the blast door obstructing a majority of the opening, in response to a first arc fault occurring in the first internal compartment, the blast door being configured to:
(1) move with respect to the internal wall,
(2) cause the piercing members to at least partially pierce through the electrical insulation surrounding the first and the second busbars,
(3) electrically couple the first and the second busbars with the blast door, and
(4) cause a second arc fault to occur within the second internal compartment.

18. The electrical enclosure of claim 17, wherein the blast door is operatively coupled to the internal wall via one or more permanent fasteners.

19. The electrical enclosure of claim 17, wherein the blast door is configured to move with respect to the internal wall in response to a pressure wave acting thereon, the pressure wave being created by the first arc fault occurring in the first internal compartment.

20. The electrical enclosure of claim 17, wherein the second arc fault at least attenuates or extinguishes the first arc fault occurring in the first internal compartment.

* * * * *